United States Patent
Shin et al.

(10) Patent No.: US 8,995,840 B2
(45) Date of Patent: Mar. 31, 2015

(54) APPARATUS AND METHOD FOR PROVIDING SYNCHRONIZED DATA BY USING VISIBLE LIGHT COMMUNICATION

(75) Inventors: Hong-Seok Shin, Gyeonggi-do (KR); Dae-Kwang Jung, Gyeonggi-do (KR); Jeong-Seok Choi, Gyeonggi-do (KR); Kyung-Woo Lee, Gyeonggi-do (KR); Sung-Bum Park, Gyeonggi-do (KR); Ki-Uk Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 497 days.

(21) Appl. No.: 12/987,479

(22) Filed: Jan. 10, 2011

(65) Prior Publication Data
US 2011/0170872 A1 Jul. 14, 2011

(30) Foreign Application Priority Data
Jan. 8, 2010 (KR) .................... 10-2010-0001922

(51) Int. Cl.
*H04B 10/00* (2013.01)
*H04B 10/116* (2013.01)
*H04B 10/114* (2013.01)

(52) U.S. Cl.
CPC .......... *H04B 10/116* (2013.01); *H04B 10/1149* (2013.01)
USPC ........... 398/118; 398/119; 398/126; 398/127; 398/128; 398/130

(58) Field of Classification Search
CPC ............... H04B 10/114; H04B 10/116; H04B 10/1141; H04B 10/1149; H04B 10/50; H04B 10/501; H04B 10/502; H04B 10/54; H04B 10/541; H04J 3/00; H04J 3/06; H04J 3/0602; H04J 3/614; H04J 3/635; H04J 3/638; H04J 3/0652; H04J 3/0658
See application file for complete search history.

(56) References Cited

U.S. PATENT DOCUMENTS

| | | | | |
|---|---|---|---|---|
| 5,068,916 | A * | 11/1991 | Harrison et al. | 455/39 |
| 6,377,793 | B1 * | 4/2002 | Jenkins | 455/412.1 |
| 2003/0085837 | A1 * | 5/2003 | Abraham | 342/357.1 |
| 2006/0056855 | A1 * | 3/2006 | Nakagawa et al. | 398/183 |
| 2009/0052894 | A1 * | 2/2009 | Murata | 398/43 |

* cited by examiner

*Primary Examiner* — Darren E Wolf
(74) *Attorney, Agent, or Firm* — The Farrell Law Firm, P.C.

(57) ABSTRACT

An apparatus and a method for providing synchronized data by using visible light communication includes, receiving a synchronization channel from a mobile communication base station using a specific mobile communication network, by a Light Emitting Diode (LED) lighting; analyzing the received synchronization channel, and extracting a synchronization signal for synchronizing the LED lighting with at least one LED lighting adjacent to the LED lighting; selecting a specific time slot of the synchronization signal based on IDentifications (IDs) of the LED lightings; and including a data frame of the LED lighting in the specific time slot, and transmitting the specific time slot, which includes the data frame of the LED lighting, to a mobile terminal.

17 Claims, 5 Drawing Sheets

APPARATUS AND METHOD FOR PROVIDING SYNCHRONIZED DATA BY USING VISIBLE LIGHT COMMUNICATION

PRIORITY

This application claims priority under 35 U.S.C. §119(a) to a Korean Patent Application entitled "Apparatus and Method for Providing Synchronized Data by Using Visible Light Communication" filed in the Korean Intellectual Property Office on Jan. 8, 2010 and assigned Serial No. 10-2010-0001922, the entire disclosure of which is incorporated herein by reference.

BACKGROUND OF THE INVENTION

1. Field of the Invention

The present invention relates generally to an apparatus and a method for providing synchronized data by using visible Light Emitting Diode (LED) lighting, and more particularly to an apparatus and a method for providing synchronized data without collision between LED lightings by using a mobile communication network.

2. Description of the Related Art

The Korean Ministry of Commerce, Industry and Energy (the present Ministry of Knowledge Economy) advised that the present manner of lighting would be replaced by LED lighting by 2015. In recent days, the luminous efficiency of LED lighting has improved, and the cost has dropped. Therefore, the LED lighting is becoming more common in the general lighting market such as the fluorescent lamp market, incandescent lamp market, and the like, as well as the specialty lighting market, such as the market for special lights used in mobile devices, displays, vehicles, traffic lights, and advertising boards, and the like. Also, due to the depletion of Radio Frequency (RF) band frequencies, possible confusion between various wireless communication technologies, the increase in demand for secure communication, the advent of $4^{th}$ generation wireless technology, and the like, interest in light-wireless technology which operates alongside RF technology has recently increased. Therefore, research into visible light wireless communication using visible light LED lighting has progressed in various enterprises, research institutes, etc.

The advantage of visible light communication for delivering information is that it is safe, has a wide usable band, and can be freely used without regulation. Moreover, since a user can see a place where the visible light reaches or a direction in which the visible light travels, he/she can accurately recognize the reception range of information. In this regard, the visible light communication is reliable in an aspect of security, and can also be operated with low power in an aspect of power consumption. Therefore, the visible light communication can be applied to hospitals, airplanes, etc., having limitations on the use of RF. Also, it can provide an additional information service using an electric billboard. A system for the visible light communication having the above advantages will be described with reference to drawings below.

Figure 1:
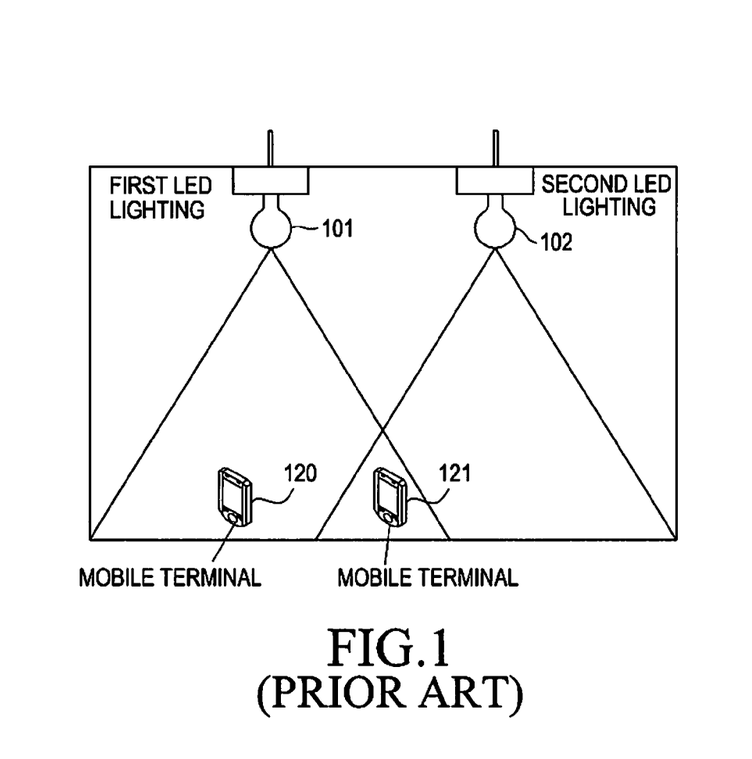
FIG. 1 is a diagram illustrating the configuration of a communication system using the conventional VLC.

FIG. 1 is a diagram illustrating the configuration of a communication system using conventional Visible Light Communication (VLC). A regular VLC system includes first and second LED lightings 101 and 102, and mobile terminals 120 and 121. First and second LED lightings 101 and 102 include LED lightings, and perform data transmission/reception by using visible light simultaneously with the role of lighting. Mobile terminals 120 and 121 include visible light transmission/reception modules, and transmit/receive data to/from first and second LED lightings 101 and 102. Each of the communication areas of first and second LED lightings 101 and 102 is the same as the relevant lighting area. Therefore, at least one mobile terminal located in the relevant lighting area can receive a signal. First and second LED lightings 101 and 102 may randomly select time slots, and transmit information during the randomly-selected time slots. Other than this, each LED lighting may select a time slot based on a preset IDentification (ID), and transmit information during the selected time slot. Mobile terminals 120 and 121 include mobile phones, Personal Digital Assistants (PDA), smart phones, etc.

Figure 2:
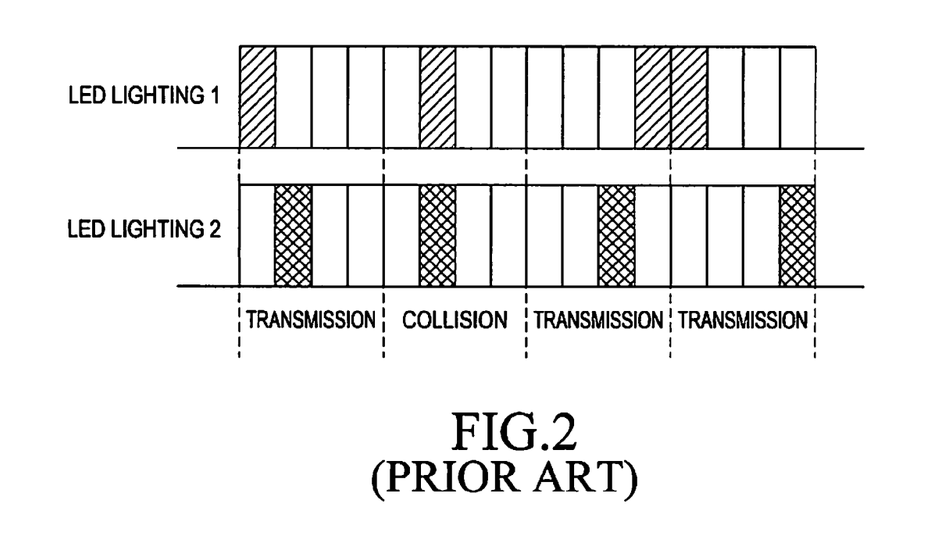
FIG. 2 is a diagram illustrating the execution of transmitting data during a time slot, which has been randomly selected, by the conventional LED lighting.

However, LED lighting cannot synchronize with another LED lighting adjacent to it. Accordingly, even though information is transmitted in an area where two lightings overlap, the possibility of collision becomes higher in a reception unit of a mobile terminal. FIG. 2 is a diagram illustrating the execution of transmitting data during a time slot, which has been randomly selected, by the conventional LED lighting. As illustrated in FIG. 2, adjacent LED lighting lamps 1 and 2, when a time slot is randomly selected and data is then transmitted during the time slot, a reception unit of a mobile terminal simultaneously receives data from two lighting lamps, so that collision may occur. Even when a time slot is selected based on an ID of the relevant LED lighting, it is not possible to know an ID of another LED lighting adjacent to the relevant LED lighting. Therefore, the same time slot period may be selected. Due to this, collision may occur.

In order to prevent the problems described above, it is possible to use a VLC system for providing data by combining power line communication based on power lines with LED lightings inside a building. However, for the VLC system as above, all LED lightings located in the building are connected to power lines, placing a server for controlling the power line communication as the center. As a result, problems arise in that the implementation of the VLC system itself is not easy, and the installation cost becomes expensive.

Therefore, there has been a demand for a method capable of synchronizing adjacent LED lightings without using a system such as the power line communication.

SUMMARY OF THE INVENTION

Accordingly, the present invention has been made to solve the above-mentioned problems occurring in the prior art, and the present invention provides an apparatus and a method, in which a reception unit of a mobile terminal receives signals transmitted from two LED lightings without collision by synchronizing two LED lightings by using a mobile communication network in an area where two LED lightings overlap.

In accordance with an aspect of the present invention, there is provided a method for providing synchronized data by using visible light communication, the method including receiving a synchronization channel from a mobile communication base station using a specific mobile communication network, by LED lighting; analyzing the received synchronization channel, and extracting a synchronization signal for synchronizing the LED lighting with at least one LED lighting adjacent to the LED lighting; selecting a specific time slot of the synchronization signal based on IDs of the LED lightings; and including a data frame of the LED lighting in the specific time slot, and transmitting the specific time slot, which includes the data frame of the LED lighting, to a mobile terminal.

In accordance with another aspect of the present invention, there is provided an LED lighting apparatus for providing synchronized data by using visible light communication, the LED lighting apparatus including a mobile communication reception unit for receiving a synchronization channel from a specific mobile communication network, analyzing the received synchronization channel, and extracting a synchronization signal for synchronizing the LED lighting apparatus with at least one LED lighting apparatus adjacent to the LED lighting apparatus; an information processing control unit for setting the extracted synchronization signal to a main synchronization signal, selecting a specific time slot of the synchronization signal based on IDs of the LED lighting apparatuses, and generating a data frame of the LED lighting apparatus, which is included in the specific time slot and is then transmitted; and an LED driving circuit unit for transmitting the data frame to a mobile terminal.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. Specifics found in the following description of the present invention, such as specific configuration elements, etc., are provided only to help comprehensive understanding of the present invention. Therefore, it will be apparent to those skilled in the art that the specifics may be changed in form and details or modified in the scope of the present invention.

In a system using the existing VLC, when a mobile terminal is located in a common area where two LED lightings overlap, two LED lightings transmit data during a random time slot period, so that the two LED lightings may use the same time slot period. Due to this, there has been a problem that collision occurs in a reception unit of a mobile terminal which receives data.

Figure 3:
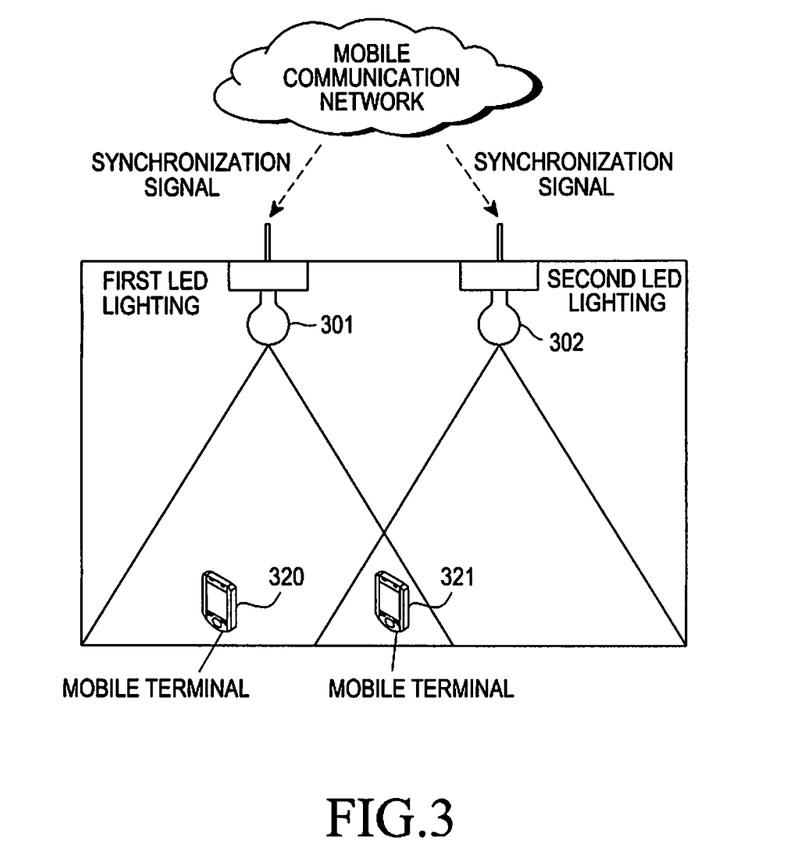
FIG. 3 is a diagram illustrating the configuration of a communication system using VLC according to an embodiment of the present invention.

Hereinafter, the present invention provides a system capable of receiving data without collision by synchronizing adjacent LED lightings by using a synchronization signal of a mobile communication network. Before describing the present invention, it is assumed that at least one LED lighting included in a single lighting group has a unique ID, and IDs of LED lightings located in the same lighting group do not coincide. FIG. 3 is a diagram illustrating the configuration of a communication system using VLC according to an embodiment of the present invention. For VLC, an LED of the existing LED lighting is connected to a port, which is located at an front end of the LED, capable of transmitting/receiving data, and additional information is then carried by LED lighting. In FIG. 3, in order to synchronize LED lightings, a synchronization signal used by mobile communication is adopted.

Generally, the communication system using VLC in FIG. 3, includes first and second LED lightings 301 and 302, and first and second mobile terminals 320 and 321. First and second LED lightings 301 and 302 transmit/receive data by using visible light simultaneously with performing the role of lighting. First and second mobile terminals 320 and 321 are equipped with transmission/reception modules, and transmit/receive data to/from first and second LED lightings 301 and 302. A communication area of each LED lighting is the same as the relevant lighting area, so that a mobile terminal located in the relevant lighting area can receive data. In order to prevent the collision of synchronization signals for data transmission, first and second LED lightings 301 and 302 of FIG. 3 use synchronization signals of a mobile communication network. Since an RF signal transmitted from a mobile communication base station occupies nearly all areas, it is reasonable that the LED lighting receives the RF signal. Since the mobile communication base station periodically transmits a synchronization signal for synchronization in the mobile communication network, it is possible to synchronize adjacent LED lightings, such as first and second LED lightings 301 and 302, with respect to data frames to be transmitted by using the synchronization signal.

As illustrated in FIG. 3, when second mobile terminal 321 is included in a common area where first and second LED lightings 301 and 302 overlap, first and second LED lightings 301 and 302 all periodically receive a synchronization signal from the mobile communication network, and are synchronized by using the received synchronization signal. Therefore, it is possible to prevent the case where collision is caused by transmitting multiple data during the same time slot by using a random time slot as in the past.

To this end, each of first and second LED lightings 301 and 302 of FIG. 3 includes a mobile communication reception unit for receiving a synchronization signal of the mobile communication network from the mobile communication base station besides a configuration element, such as an existing LED or LED driving unit. A reception channel received through the mobile communication network is intended to be fixed to a channel through which mobile communication provides a synchronization signal.

Figure 4:
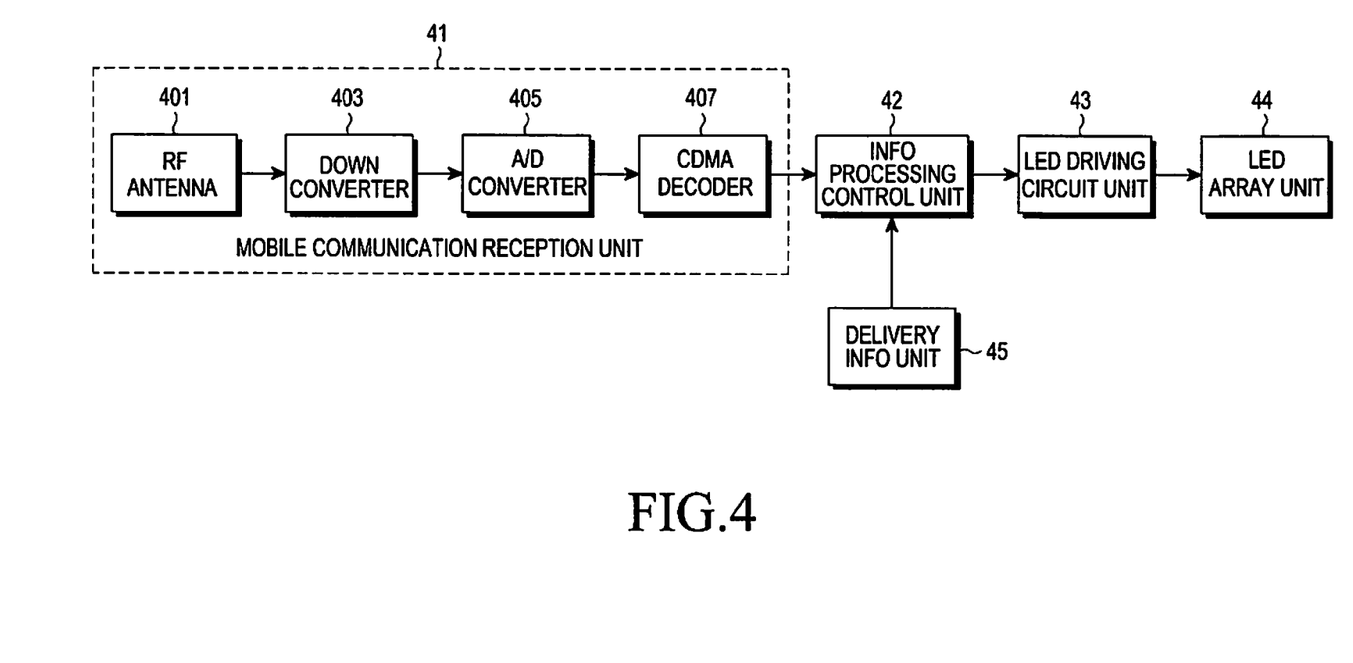
FIG. 4 is a block diagram illustrating an internal configuration of LED lighting according to an embodiment of the present invention.

FIG. 4 is a block diagram illustrating the internal configuration of the LED lighting according to an embodiment of the present invention. FIG. 4 illustrates the internal configuration of the LED lighting synchronized by using a synchronization channel of Wide-band Code Division Multiple Access (WCDMA). In WCDMA, a synchronization channel is used to synchronize a mobile terminal with a mobile communication base station. The synchronization channel is used for cell search, and is used to transmit a synchronization signal by 10 ms periods. The synchronization signal includes a spreading sequence occupying a first 256-chp period of each time slot. This spreading sequence is set so that a matched filter may be implemented in the easiest manner in each system.

The LED lighting of FIG. 4, for receiving the synchronization channel of the WCDMA, as described above, includes a mobile communication reception unit 41, an information processing control unit 42, an LED driving circuit unit 43, an LED array unit 44, and a delivery information unit 45. Mobile communication reception unit 41 includes an RF antenna 401, a down converter 403, an Analog to Digital (A/D) converter 405, and a CDMA decoder 407. Mobile communication reception unit 41 analyzes a received synchronization channel, and extracts a synchronization signal.

Referring to FIG. 4, mobile communication reception unit 41 receives a synchronization channel from a specific base station of the mobile communication network, analyzes the received synchronization channel, and extracts a synchronization signal. In more detail, mobile communication reception unit 41 receives the synchronization channel from the specific base station of the mobile communication network through RF antenna 401, and transmits the received synchronization channel to down converter 403. The synchronization channel received by down converter 403 is converted into a synchronization channel having a low frequency, and is provided to A/D converter 405. A/D converter 405 converts analog values of the received synchronization channel into digital values, and provides the digital values to CDMA decoder 407. CDMA decoder 407 decodes the digital values of the received synchronization channel, and extracts a synchronization signal.

The synchronization signal extracted as above is provided to information processing control unit 42. Information processing control unit 42 sets the received synchronization signal to a main synchronization signal of an LED lighting. Information processing control unit 42 LED receives various pieces of delivery information, including an LED lighting ID provided by delivery information unit 45, etc. and determines a time slot, during which a data frame is to be transmitted, and generates a data frame and a visible light frame, by using the synchronization signal. At least one frame, which has been generated, is provided to LED driving circuit unit 43. LED driving circuit unit 43 determines whether each LED is driven and a time point when each LED is driven, by using at least one frame which has been received. After that, at least one frame is provided to LED array unit 44. LED array unit 44 transmits at least one frame, which has been received, to a mobile terminal in the form of a light signal.

Multiple LED lightings, which are included in a single lighting group, have different IDs, and determine time slots, during which data frames are to be transmitted, by using the synchronized signal based on the different IDs. Since overlapping time slots are not generated, each LED lighting can sequentially transmit a data frame without collision.

Figure 5:
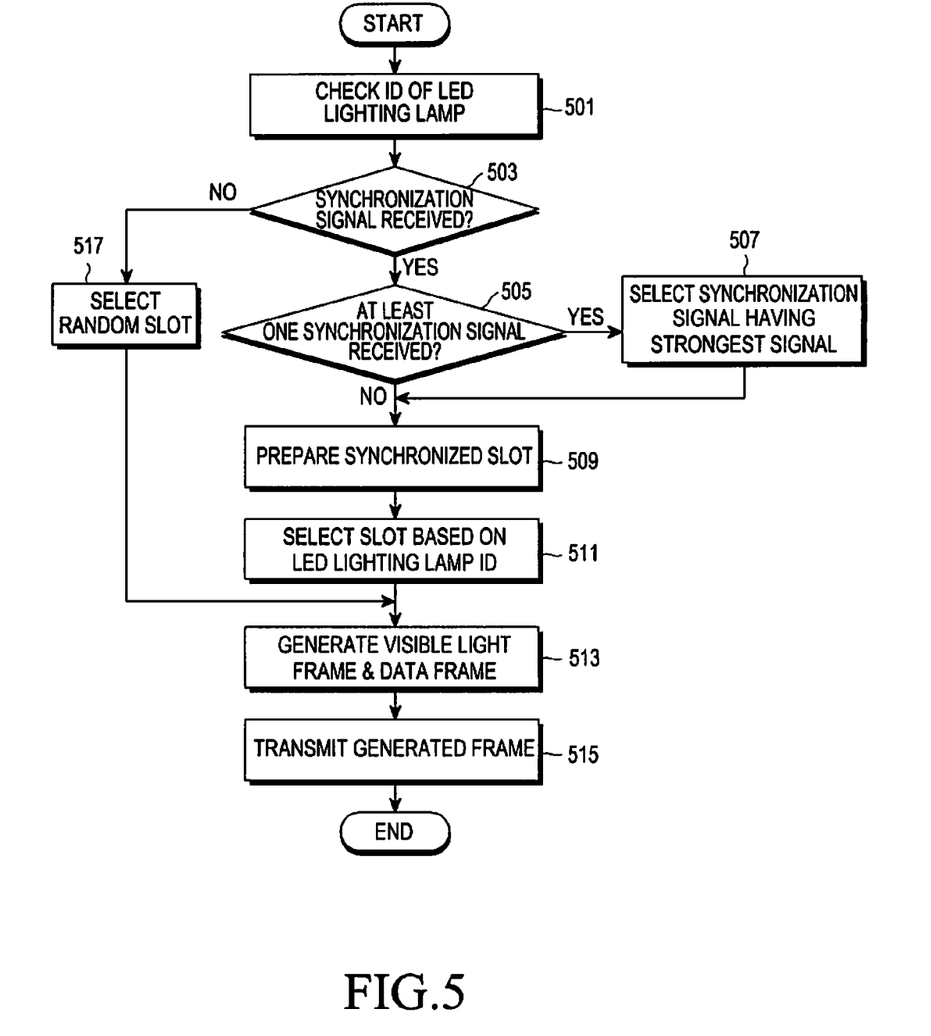
FIG. 5 is a flowchart illustrating a process of transmitting data by using synchronized LED lightings according to an embodiment of the present invention.

FIG. 5 is a flowchart illustrating a process of transmitting data by using synchronized LED lightings according to an embodiment of the present invention.

Referring to FIG. 5, in Step 501, an ID of each LED lighting lamp is checked. Each LED lighting lamp has a unique ID. Each checked ID is to be used later for the application of synchronized time slots. In Step 503, each LED lighting lamp checks whether a synchronization signal is received by the mobile communication reception unit. The synchronization signal may be received through the mobile communication base station, and is received by predetermined periods. When the synchronization signal is not received, each LED lighting proceeds to Step 517. In Step 517, each LED lighting randomly sets a time slot, during which data is to be transmitted, as in the past, and proceeds to Step 513. In Step 513, a visible light frame and a data frame are generated based on the randomly-set time slot. Then, each LED lighting proceeds to Step 515. In Step 515, the generated visible light frame and data frame are transmitted so that a mobile terminal may receive them. Each time slot is randomly set, and therefore, collision may occur between multiple pieces of data received by a reception unit of the mobile terminal.

When a synchronization signal is received from a mobile communication network, such as a mobile communication base station, each LED lighting proceeds to Step 505. In Step 505, it determines whether the number of received synchronization signals is equal to or more than '1.' When a single synchronization signal is received, each LED lighting proceeds to Step 509. In Step 509, a synchronized time slot is prepared by using the received synchronization signal. When multiple synchronization signals are received, each LED lighting proceeds to Step 507, and selects a synchronization signal having the strongest signal intensity among multiple received synchronization signals. The reason for selecting one of multiple received synchronization signals is that information of a synchronization signal transmitted by each base station is different and therefore, there is a need for determining which synchronization signal is to be used.

Mobile communication base stations are usually distributed with a distance of '1' km between them. Since the distance of '1' km is even larger than an interval between LED lightings, one or more LED lightings, which are adjacent, perform(s) synchronization by using a synchronization signal having the strongest signal intensity among received synchronization signals. Namely, multiple LED lightings located in a specific area can be synchronized for data transmission by using a synchronization signal received from a single mobile communication base station.

When the synchronization signal having the strongest signal intensity is selected, each LED lighting proceeds to Step 509. In Step 509, a synchronized time slot is prepared. In Step 511, which period of the time slot is to be used for data transmission is determined based on the ID of each LED lighting lamp, which has been checked in Step 501. Since IDs of LED lightings located in the same group are all different, only one data frame is carried and transmitted by a single time slot. In Step 513, a visible light frame and data frame are generated. In Step 515, the generated visible light frame and data frame are transmitted so that they may be received by a mobile terminal. Therefore, data can be received without collision by a reception unit of the mobile terminal.

Referring to the flowchart of FIG. 5, an example of data transmission using time slots, which is synchronized between adjacent LED lightings, is described as follows.

Figure 6:
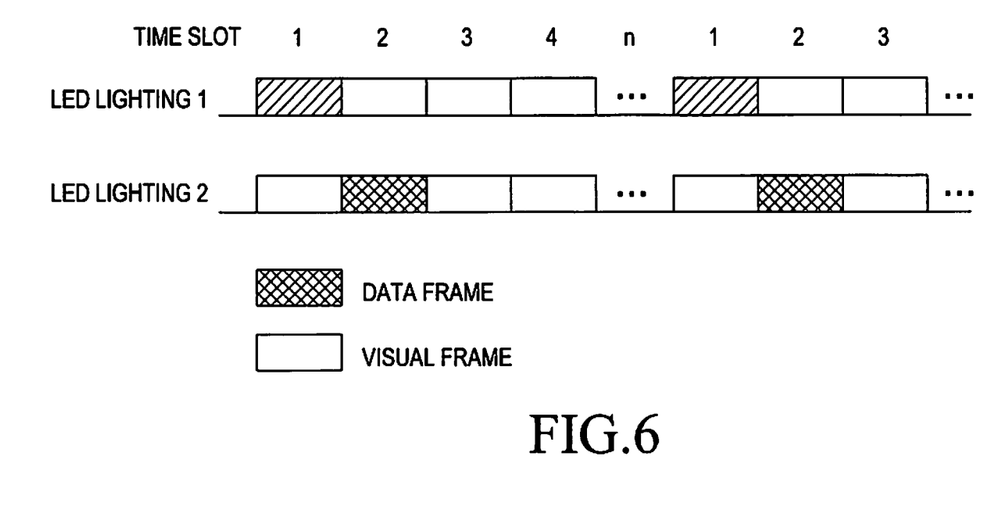
FIG. 6 is a diagram illustrating the execution of transmitting data based on synchronized time slots according to an embodiment of the present invention.

FIG. 6 is a diagram illustrating the execution of transmitting data based on synchronized time slots according to an embodiment of the present invention.

Referring to FIG. 6, time slots are synchronized by using a synchronization signal received through the mobile communication network. Because a single time slot is intended to carry and transmit only a data frame of a single LED lighting, it is possible to prevent collision caused by data frames, which are simultaneously received from at least two LED lightings. FIG. 6 illustrates a process of synchronizing time slots in such a manner that the first time slot may carry and transmit a data frame of the first LED lighting and the second time slot may carry and transmit a data frame of the second LED lighting. A time slot, which does not carry and transmit a data frame, carries and transmits a visible light frame.

The mobile communication base station periodically transmits a synchronization signal. Therefore, whenever periodically receiving the synchronization signal, at least one LED lighting makes a time slot, which has been determined as described above, carry and transmit a data frame to a mobile terminal. Also, it makes a remaining time slot carry and transmit a visible light frame to the mobile terminal.

According to the present invention as described above, a mobile communication reception unit is added to LED lighting without an additional configuration of a system, such as network connection, by using accurate indoor location information between LED lightings using a mobile communication network. Therefore, data can be efficiently transmitted without collision.

While the invention has been shown and described with reference to certain embodiments thereof, it will be understood by those skilled in the art that various changes in form and detail may be made therein without departing from the spirit and scope of the invention. Therefore, the spirit and scope of the present invention must be defined not by the described embodiments thereof but by the appended claims and equivalents of the appended claims.

What is claimed is:

1. A method for providing synchronized data by using visible light communication, the method:
   receiving a synchronization channel from a mobile communication network, by a first Light Emitting Diode (LED) lighting apparatus;
   analyzing the received synchronization channel, and extracting a synchronization signal for synchronizing the first LED lighting apparatus with at least one second LED lighting apparatus adjacent to the first LED lighting apparatus;
   synchronizing transmission of light as illumination and of light as data by the first LED lighting apparatus with the extracted synchronization signal, whereby the transmission is synchronized in time slots;
   selecting a time slot for the first LED lighting apparatus to transmit a data frame based on an Identification (ID) of the first LED lighting apparatus so as to not overlap with any time slot in which the at least one second LED lighting apparatus transmits a data frame; and
   transmitting the data frame of the first LED lighting apparatus in the time slot to a mobile terminal,
   wherein receiving the synchronization channel comprises:
      determining if synchronization channels have been received from more than one base station in the mobile communication network; and
      selecting, if synchronization channels have been received from more than one base station in the mobile communication network, a synchronization channel having the strongest signal intensity.

2. The method as claimed in claim 1, wherein the mobile communication network periodically transmits the synchronization channel used for synchronization with the mobile terminal to the first LED lighting apparatus.

3. The method as claimed in claim 1, wherein the first LED lighting apparatus and the at least one second LED lighting apparatus adjacent to the first LED lighting apparatus are included in a single lighting group, and each LED lighting apparatus has a different ID.

4. The method as claimed in claim 3, wherein the at least one adjacent second LED lighting apparatus selects a time slot for transmitting a data frame based on the at least one second LED lighting apparatus unique ID.

5. The method as claimed in claim 1, wherein the first LED lighting apparatus transmits a visible light frame as illumination in a time slot other than the time slot in which the data frame is transmitted.

6. An LED lighting apparatus for providing synchronized data by using visible light communication, comprising:
   a mobile communication receptor configured to receive a synchronization channel from a mobile communication network, to analyze the received synchronization channel, and to extract a synchronization signal for synchronizing a first LED lighting apparatus with at least one second LED lighting apparatus adjacent to the first LED lighting apparatus;
   an information processing controller configured to set the extracted synchronization signal to synchronize time slots for transmitting light as illumination and light as data, to select a time slot for the first LED lighting apparatus to transmit a data frame based on an Identification (ID) of the first LED lighting apparatus so as to not overlap with any time slot in which the at least one second LED lighting apparatus transmits a data frame, and to generate the data frame of the first LED lighting apparatus, which is transmitted in the time slot; and
   an LED driving circuit configured to transmit the data frame to a mobile terminal,
   where the mobile communication receptor is further configured to determine if synchronization channels have been received from more than one base station in the mobile communication network, and to select, if synchronization channels have been received from more than one base station in the mobile communication network, a synchronization channel having the strongest signal intensity.

7. The LED lighting apparatus as claimed in claim 6, wherein the mobile communication receptor comprises:
   a Radio Frequency (RF) antenna for receiving the synchronization channel from the mobile communication network; and
   a Code Division Multiple Access (CDMA) decoder for decoding the received synchronization channel, and extracting the synchronization signal.

8. The LED lighting apparatus as claimed in claim 6, wherein the mobile communication receptor periodically receives the synchronization channel from the mobile communication network.

9. The LED lighting apparatus as claimed in claim 6, wherein the first LED lighting apparatus and the at least one second LED lighting apparatus adjacent to the first LED lighting apparatus are included in a single lighting group, and each LED lighting apparatus has a different ID.

10. The LED lighting apparatus as claimed in claim 9, wherein the at least one adjacent second LED lighting apparatus selects a time slot for transmitting a data frame based on the at least one adjacent second LED lighting apparatus unique ID.

11. The LED lighting apparatus as claimed in claim 6, wherein the first LED lighting apparatus transmits a visible light frame as illumination in a time slot other than the time slot in which the data frame is transmitted.

12. A method for a Light Emitting Diode (LED) lighting apparatus to transmit light as illumination and light as data in synchronized time slots, the method comprising:
   receiving a synchronization signal from a mobile communication network;
   using the synchronization signal to synchronize time slots for the transmission of light as illumination and light as data;
   selecting, a time slot for the LED lighting apparatus to transmit a data frame based on an identification of the LED lighting apparatus so that the selected time slot does not overlap with any time slot in which any other adjacent LED lighting apparatus transmits a data frame; and
   transmitting the data frame in the selected time slot,
   wherein receiving a synchronization signal comprises:
      determining if synchronization signals have been received from more than one base station in the mobile communication network; and
      selecting, if synchronization signals have been received from more than one base station in the mobile communication network, a synchronization signal having the strongest signal intensity.

13. The method of claim 12, wherein the LED lighting apparatus transmits light as illumination and light as data in different synchronized time slots.

14. The method of claim 12, wherein the LED lighting apparatus transmits light as illumination and light as data in the same synchronized time slot, and the selected time slot is used for transmitting both light as illumination and light as the data frame.

15. The method of claim 12, wherein the LED lighting apparatus is one of a group of LED lighting apparatuses, and each LED lighting apparatus in the group has a unique identification.

16. The method of claim 12, wherein the synchronization signal is a Wide-band Code Division Multiple Access (WCDMA) synchronization channel.

17. The method of claim 12, further comprising:
determining if a synchronization signal has been received from the mobile communication network; and
if no synchronization signal has been received from the mobile communication network, randomly selecting a time slot for the transmission of the data frame.

* * * * *